United States Patent [19]

Hale

[11] Patent Number: 4,799,721
[45] Date of Patent: Jan. 24, 1989

[54] MEANS TO FACILITATE HANDLING OF CORE MEMBERS AND ROLLS OF MATERIAL

[75] Inventor: James L. Hale, Smyrna, Ga.

[73] Assignee: Amoco Corporation, Chicago, Ill.

[21] Appl. No.: 18,202

[22] Filed: Feb. 24, 1987

[51] Int. Cl.⁴ .................. B65G 7/12; B65H 75/40
[52] U.S. Cl. ....................... 294/1.1; 16/125; 242/96; 294/137; 294/158
[58] Field of Search .......... 294/1.1, 15, 25, 26, 294/27.1, 67.1, 74, 89, 92–98.1, 137, 145, 149, 153–158, 164, 165; 16/110 R, 114 R, 114 B, 125; 242/58.6, 79, 85, 85.1, 96, 106, 127, 129.5, 136; 414/559, 571, 910, 911

[56] References Cited

U.S. PATENT DOCUMENTS

| | | | |
|---|---|---|---|
| 673,830 | 5/1901 | Wade | 294/26 |
| 1,252,300 | 1/1918 | Phillips | 242/136 X |
| 1,510,564 | 10/1924 | Stockfleth et al. | 294/1.1 |
| 1,857,091 | 5/1932 | Von der Horst | 294/1.1 |
| 1,890,734 | 12/1932 | Kuberka | 294/97 X |
| 2,582,269 | 1/1952 | Oftedahl | 16/125 X |
| 3,174,703 | 3/1965 | Falkum | 242/96 |
| 3,301,451 | 1/1967 | Halverson | 294/158 |
| 4,006,930 | 2/1977 | Cawley et al. | 294/98.1 |
| 4,085,875 | 4/1978 | Campbell | 294/158 |
| 4,133,435 | 1/1979 | Hosbein | 414/911 X |
| 4,345,788 | 8/1982 | Newton | 294/1.1 |
| 4,591,200 | 5/1986 | Randen | 294/96 |
| 4,600,163 | 7/1986 | Hummel et al. | 294/97 X |

Primary Examiner—Johnny D. Cherry
Attorney, Agent, or Firm—Maria Parrish Tungol; William H. Magidson; Ralph C. Medhurst

[57] ABSTRACT

For convenient handling of a core member or a roll of material comprising a core member, a strap is attached to the core member. An intermediate section of the strap is preferably looped and extends outwardly of the core. The strap ends are either fixed to the outer surface of the core or through at least one opening in the core and underlie the winding, or contemplated winding. In the case of a tubular core, such ends cna be fixed to the core's inner surface of a plug element.

6 Claims, 2 Drawing Sheets

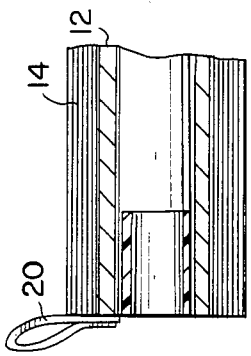
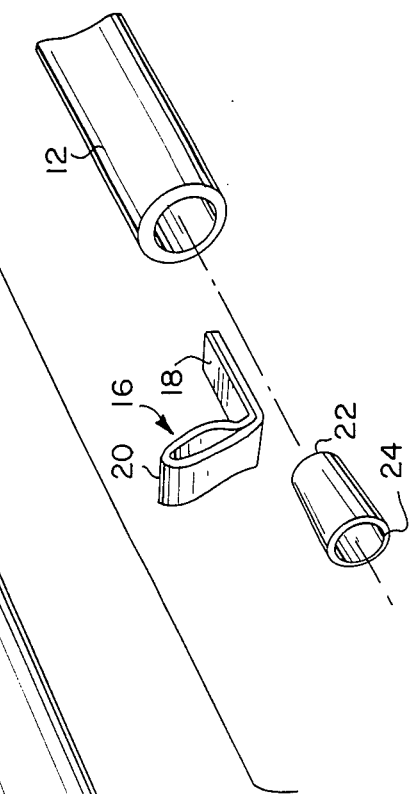
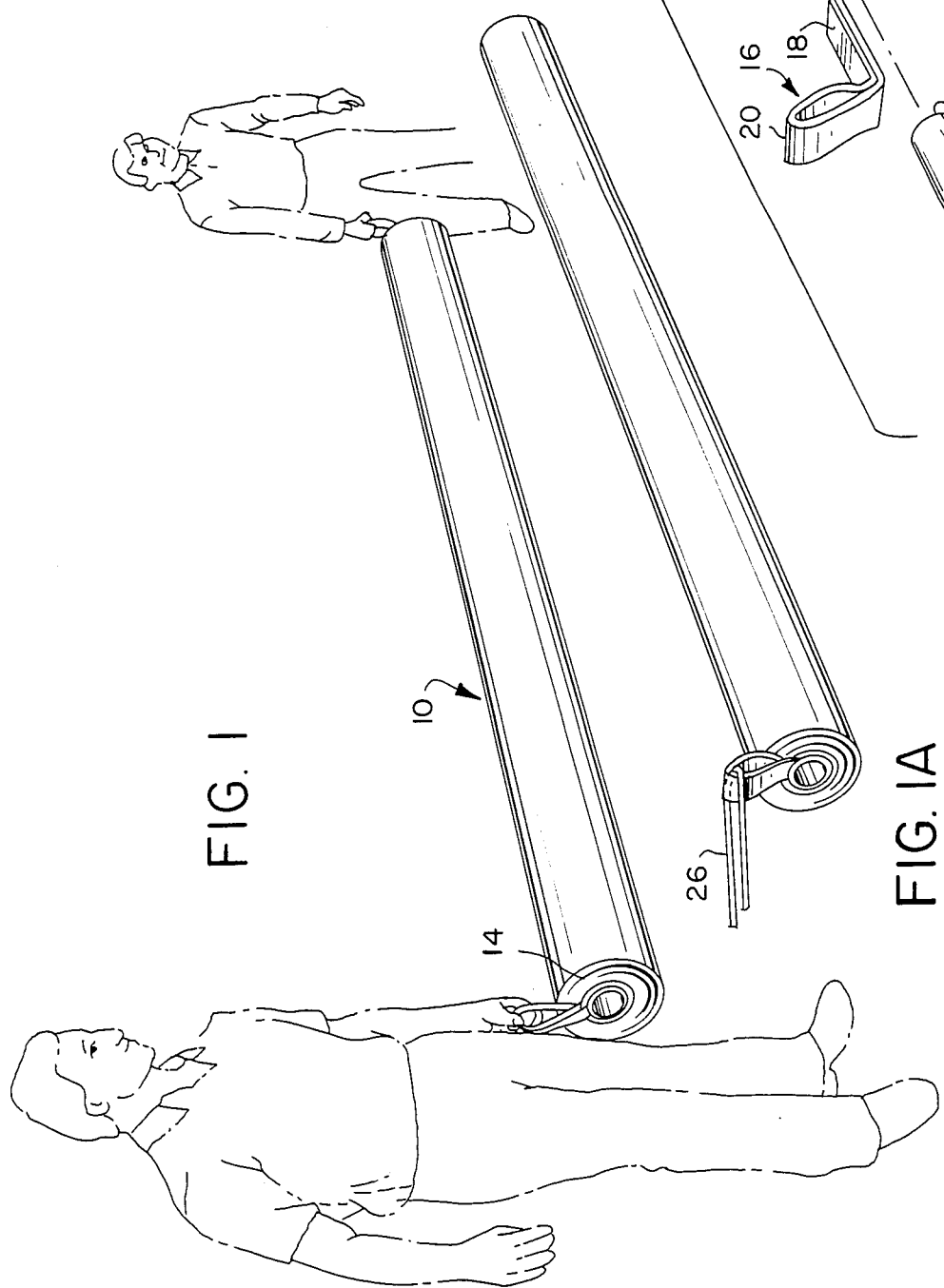

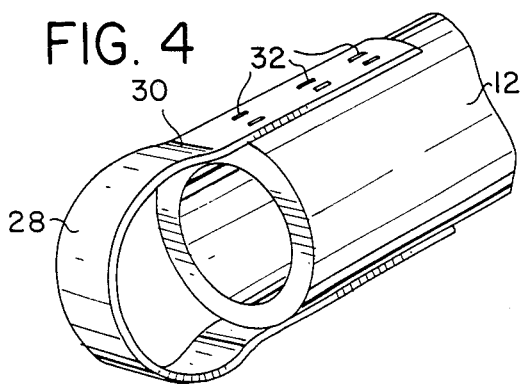
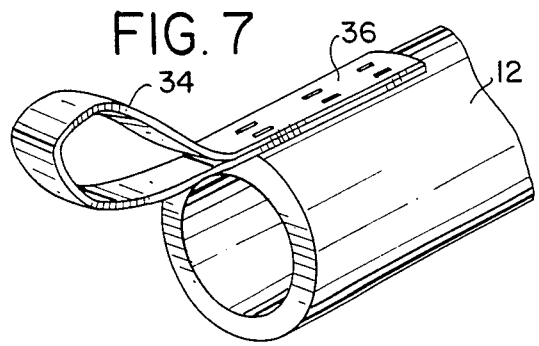
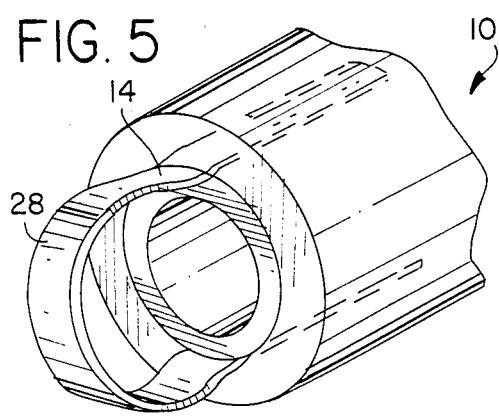
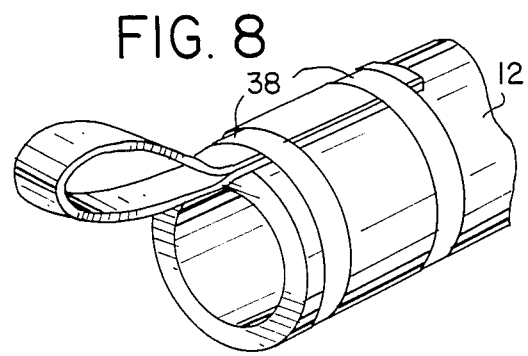
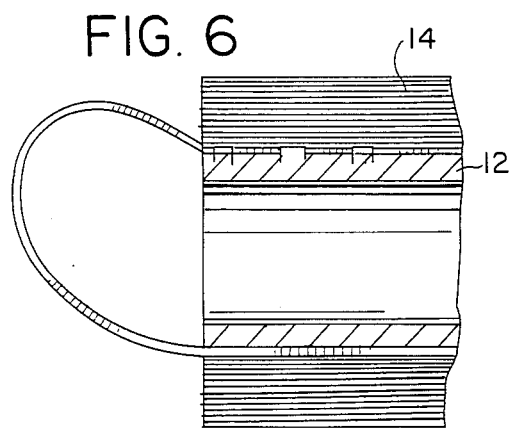
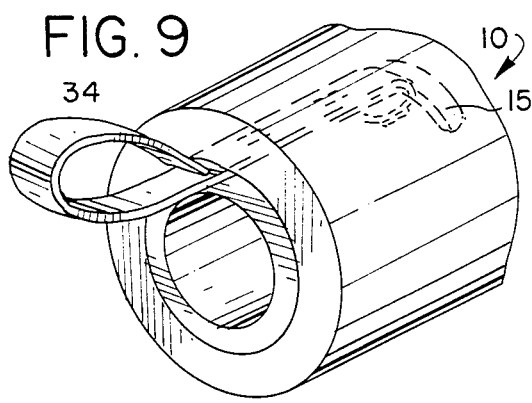
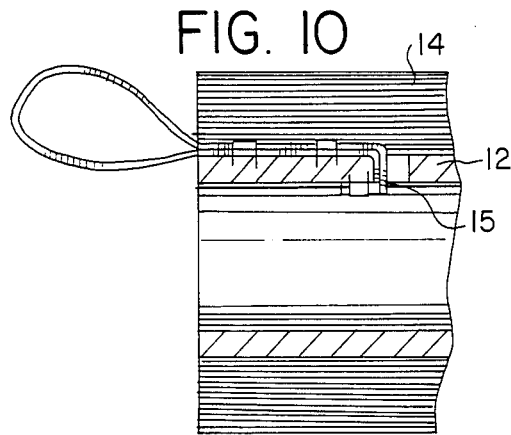

MEANS TO FACILITATE HANDLING OF CORE MEMBERS AND ROLLS OF MATERIAL

TECHNICAL FIELD

The present invention relates to a core member having adjunct means to facilitate handling of an article comprising the core member.

BACKGROUND OF THE INVENTION

Rolls of materials used in industrial applications are often large and cumbersome to handle. Typically, this problem is overcome by the use of equipment such as forklifts which are available at warehouses, plants and similar locations. However, some products such as civil engineering fabrics, are often delivered at the work site which can be a road or highway. The rolls of fabric are usually delivered by truck and sometimes only part of the entire load is designated for a particular work site. Since the rolls of engineering fabric are relatively long and heavy, there exists a need for a means of handling such rolls at a location where specialized equipment such as a forklift is not available.

To facilitate conveyance and safe handling of a core member or a roll of material, it is known to append certain fixtures to the core and to apply requisite motive force directly to the fixture.

Such fixtures are illustrated in U.S. Pat. Nos. 1,510,564 to Stockfleth et al., 4,226,380 to John W. Gay, and 4,396,166 to Calvin Kollman, each of which fixtures require an assemblage of parts, including a rod or the like member disposed axially through the core, means for fixing or maintaining the rod-core spatial relationship, and means on the rod end, or ends, adapted for application of a motive force.

Other known means for similar handling are illustrated by a split wedge annulus that is cammed into frictional or penetrating contact with an inner surface by an axially disposed cam element to which a bolt handling motive force is applied.

Another known type of handling means that associate with an inner core surface comprises a tong type tool having its grasping or piercing jaws outwardly directed.

The aforegoing means for handling are not fully satisfactory for the purpose.

It is an object of the present invention to provide a roll of material having a core member especially adapted to facilitate application of a motive force.

It is a further object of the invention that the core member include a length of strap or the like material extending from an end or surface thereof adapted to receive aforesaid motive force.

It is another object of the invention that the novel core member be an uncomplicated combination of structural elements that are easily assembled, inexpensive to manufacture and for connection to a motive force for roll handling purposes does not require a complicated, sophisticated or expensive tool.

SUMMARY OF THE INVENTION

The present invention is directed to novel and improved means to facilitate handling of an article comprising a core member, especially to such an article comprised of a roll of material. The invention is particularly useful when the article is relatively heavy or otherwise awkward, unwieldy, or cumbersome. The handling contemplated can be loading or unloading, assembling for processing in manufacture, turning, pulling, towing, hoisting, carrying and the like.

For a more fully developed presentation of the invention, and preferred embodiments thereof, reference is made to the following descriptive matter and attached drawings.

BRIEF DESCRIPTION OF THE DRAWINGS

FIG. 1 is a perspective view of a first embodiment of the invention being manually handled.

FIG. 1A is a perspective view of the invention similar to FIG. 1, but showing a mechanical attachment for application of a motive or handling force.

FIG. 2 is a partial elevational view in section of the embodiment of FIGS. 1, 1A.

FIG. 3 is an exploded view of the embodiment of FIGS. 1, 1A.

FIGS. 4 through 6 illustrate a second embodiment of the invention.

FIGS. 7 and 8 illustrate a third embodiment of the invention.

FIGS. 9 and 10 illustrate a fourth embodiment of the invention.

DETAILED DESCRIPTION OF THE INVENTION

The embodiments shown and described are only illustrative of the present invention and are not to be construed as being delimitive thereof, since once apprised of the invention, changes in structure would be readily apparent to one skilled in the art. Referring to the drawings which show preferred embodiments of the invention and wherein like numerals indicate like elements of structure, there is shown in FIGS. 1 through 3 a roll of material 10 comprised of a tubular core element 12; material windings 14 thereon; strap 16 having overlapped ends, as a tang portion 18 disposed within the core, and a loop portion 20 extending outwardly of the core; and a plug element 22 disposed within the core and operatively associated with the strap tang whereby to fix the tang to the core's inner wall. The expression "roll of material" used herein means a core member having at least one length of material wound thereon. The term "material" includes a variety of natural and synthetic materials which are capable of being supported on a core member. The material which can be used in the present invention can be fibrous or non-fibrous, woven or nonwoven, mesh, solid sheet, metal or non-metal materials or combinations thereof. The present invention can be used for textile products such as fibers and fabrics such as civil engineering fabrics. A single core member can support a variety of the aforementioned materials depending upon the desired results. As shown in FIG. 2, the plug can be tapered at its inner end to facilitate entry of the plug into the core opening. The plug can be solid or tubular so that it fits into the core opening in a sleeve-like manner. The strap can be attached to the plug itself or to the inner surface of the core element by an adhesive, staples, fusion, or other attachment means. Also, the strap can be a part of the plug, for example, part of a molded plastic plug.

As illustrated in FIG. 1, the roll can be manually handled or, as FIG. 1A suggests, may be mechanically handled through a hook or line 26 applied to the strap loop and the strap means may be assembled to either one or both core ends.

A second embodiment of the invention is disclosed in FIGS. 4 through 6 wherein a loop 28 is formed by a strap having its respective ends 30 stapled at 32 to the core's radially opposed outer surfaces; only one set of staples being shown.

The strap, core element, and plug element can each be of a natural, synthetic, or metal material, for example, a strap made of a woven textile material, a cardboard or plastic core member, and a wooden plug element. The core can be tubular or solid in a shape which is convenient for supporting any intended windings. Typically, the core is a cylindrical tube. The strap can be fixed by any convenient means; as for instance by stapling, stitching, banding, adhesion, and fusion. Further, instead of a strap as shown, the loop can be formed by a braided, wire, metal or rope like material.

FIGS. 7 and 8 disclose a third embodiment of the invention wherein a loop 34 is formed by a strap having its ends 36 overlapped and fixed to the core's outer surface by stapling (FIG. 7) or banding 38 (FIG. 8) or by adhesion or fusion. FIGS. 9 and 10 illustrate the fourth embodiment of the invention wherein the strap is attached to the core by means of an opening 15 in the core.

The straps as illustrated in FIGS. 4 through 10 are preferably located on the outer surface, since the windings inhibit strap displacement. However, it is obvious that the strap ends may be stapled, glued, or attached by any other convenient means to the core's inner surface.

The embodiments shown and described are only illustrative of the present invention and are not to be construed as being delimitive thereof, since once apprised of the invention, changes in structure would be readily apparent to one skilled in the art. Such readily apparent changes, without patentable distinction, are illustrated by a roll comprised of separate and distinct windings spaced along the length of the core and a handling loop, or handling loops, disposed as in the foregoing descriptive matter or located on the core, intermediate the windings.

Another instance of readily apparent structural change, that lies within the inventive concept, relates to the embodiment of FIGS. 1 through 3 wherein the illustrated plug could be replaced by a plug having a roller-bearing part whereby in handling, the winding can conveniently be unrolled.

It is contemplated that loops extending from each end of the core can comprise the exposed ends of a single endless band and that such band may be fixed to the outer core surface, in a manner as in either of FIGS. 4 through 10, or may have an overlapped intermediate portion that is fixed to the core's inner surface or the band's intermediate portions may each be fixed to a respective inner and outer core surface.

Hence, the present invention includes all modifications of structure encompassed within the spirit and scope of the following claims.

What is claimed is:

1. A roll of material having means to facilitate handling, said means comprising a core member having at least one material wound thereon and at least one strap-like element having a first section fixed to an axially extending outer end surface of the core member and said material overlies such fixed section whereby to further fix the element to the core member and a second section extending outwardly of the core member and free of said material whereby the element is adapted to receive a motive force to effect said handling.

2. A roll of material as in claim 1 wherein a second such element is similarly operatively associated with the axially opposed end of the core member.

3. A roll of material as in claim 1 wherein said second section is in loop configuration.

4. A roll of material as in claim 1 wherein said element has end portions, said end portions being overlapped and fixed to said core member and said first section includes said end portions.

5. A roll of material as in claim 1 wherein said element has end portions, said end portions being fixed to radially opposed portions of said outer end surface and said first section includes said end portions.

6. A roll of material as in claim 1 wherein the core member has at least one opening and the first section of the strap-like element extends through said opening.

* * * * *